June 4, 1935.  W. B. FAGEOL  2,003,431
MOTOR VEHICLE CONTROL
Filed Aug. 21, 1931   3 Sheets-Sheet 3
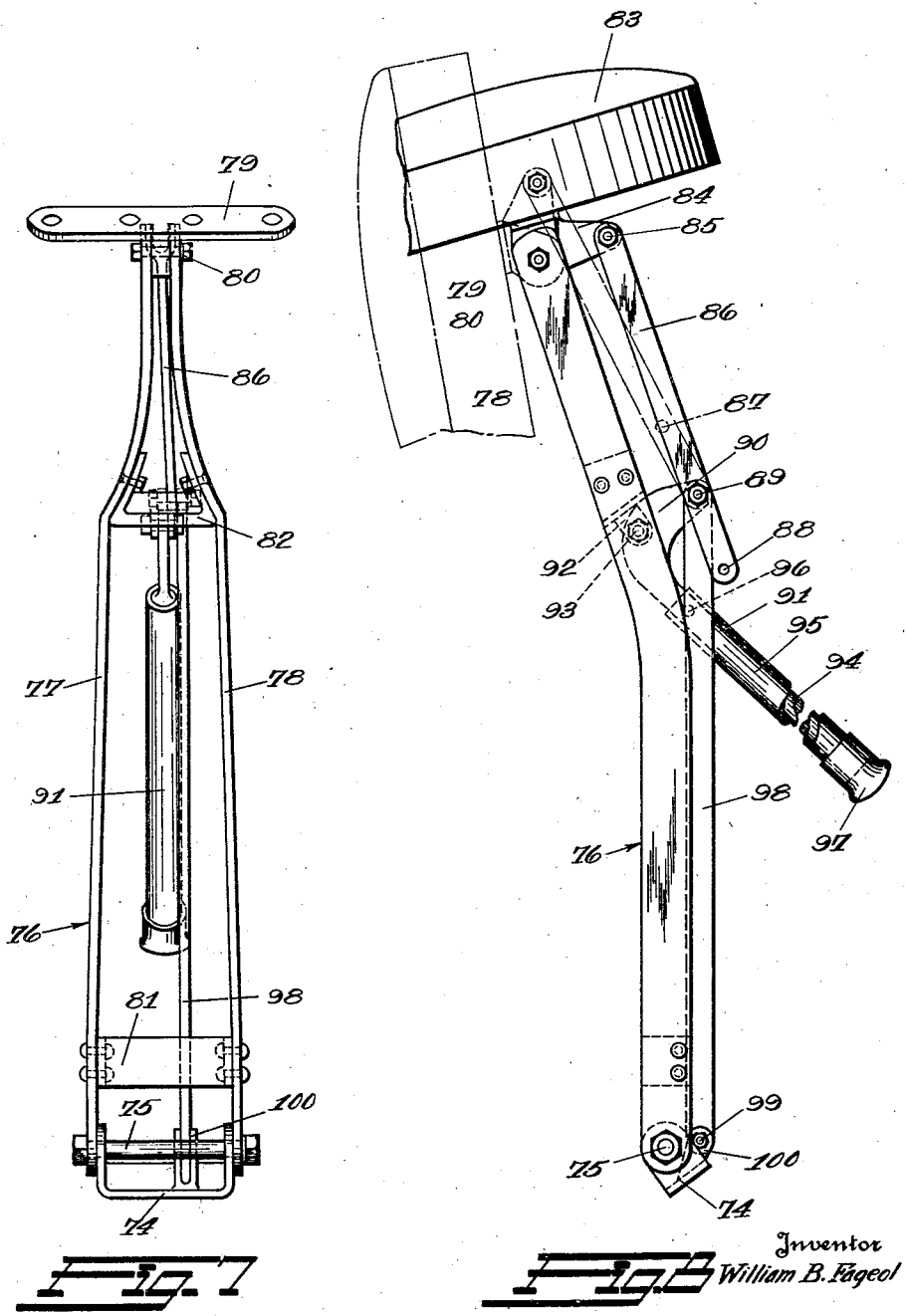
Inventor
William B. Fageol
By Strauch & Hoffman
Attorneys Patented June 4, 1935

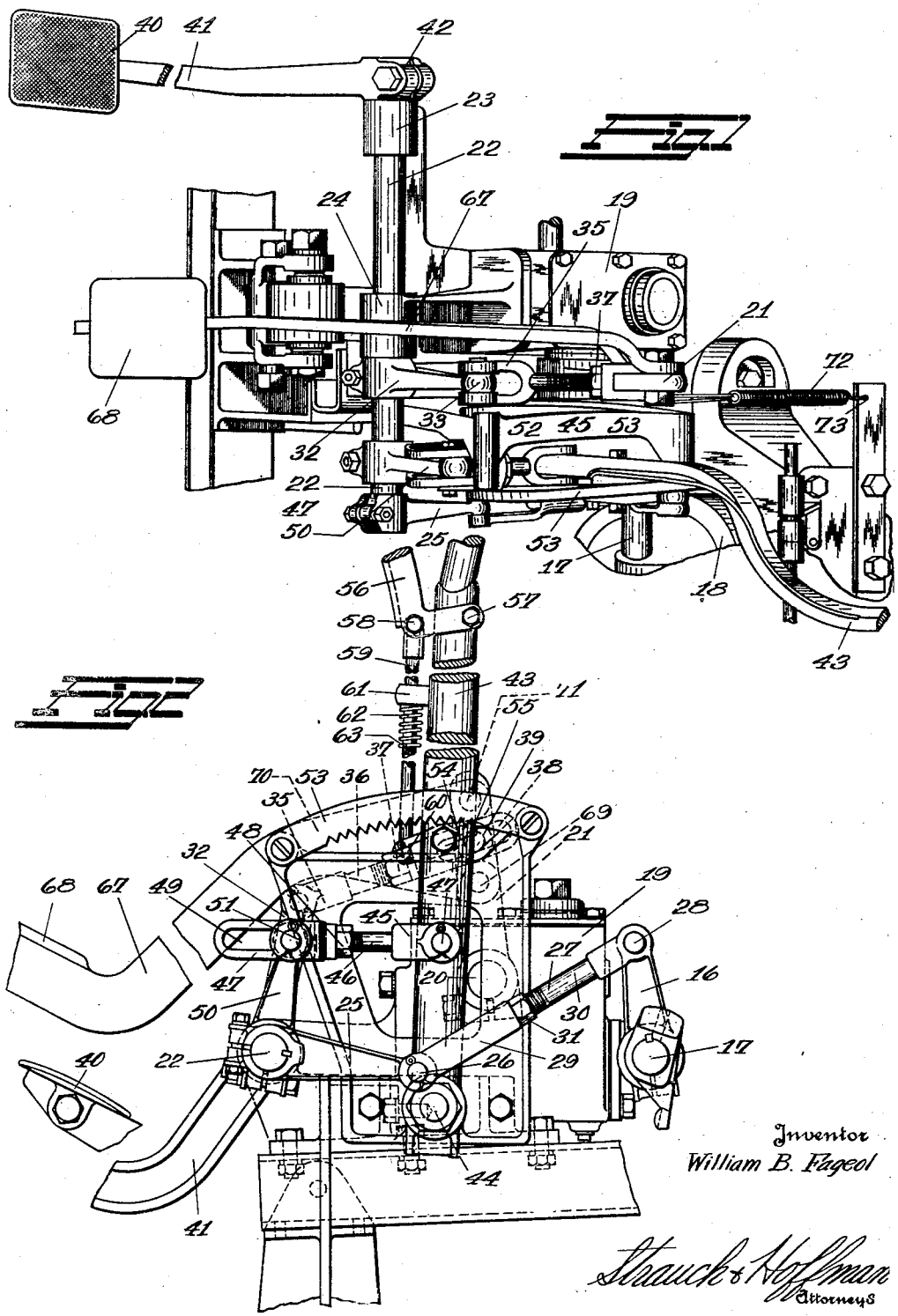

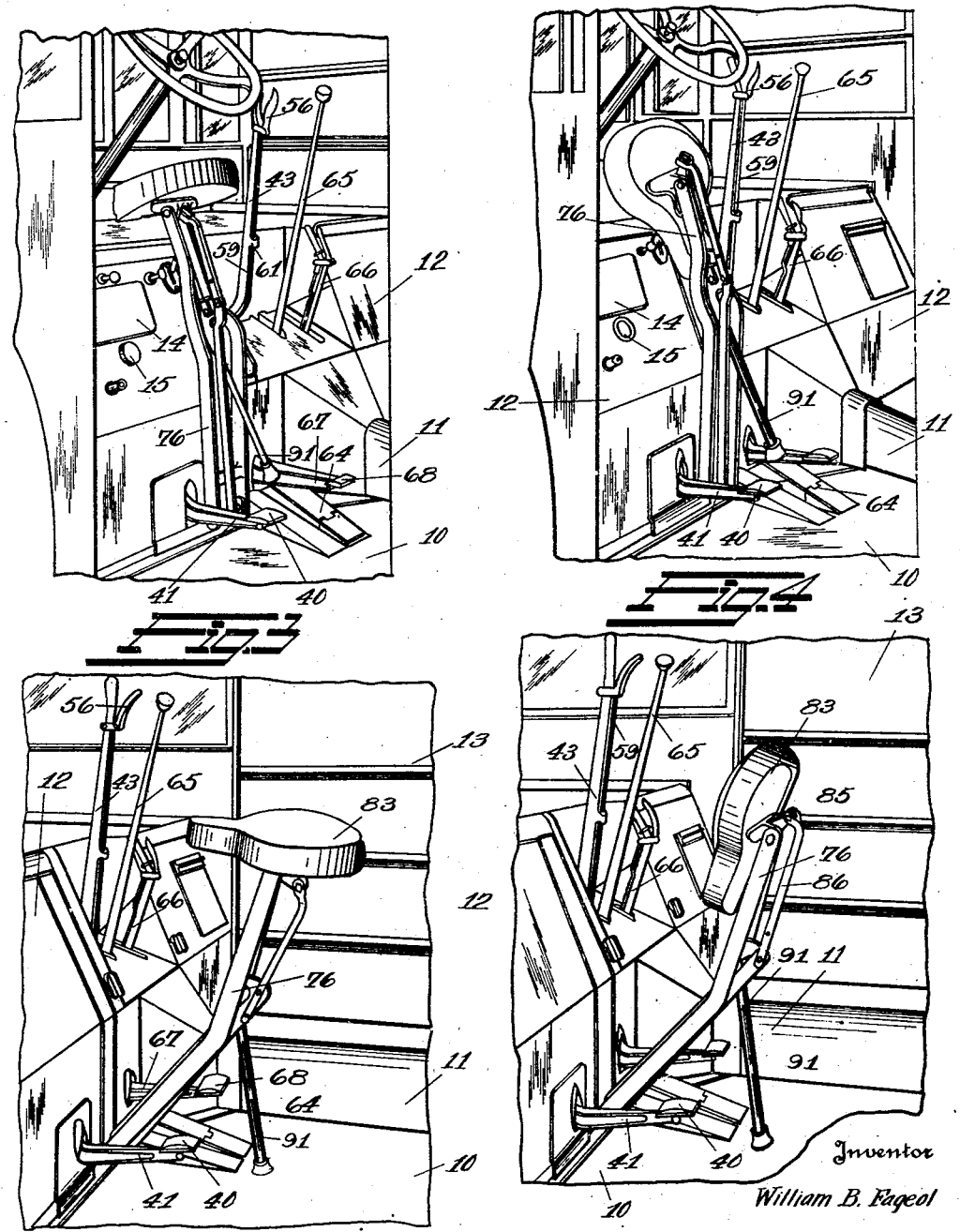

2,003,431

UNITED STATES PATENT OFFICE 2,003,431

MOTOR VEHICLE CONTROL

William B. Fageol, Kent, Ohio

Application August 21, 1931, Serial No. 558,616

7 Claims. (Cl. 180—77)

This invention relates to an arrangement for controlling the operation of a motor vehicle, such as a delivery vehicle. More particularly, the invention relates to a control arrangement for a vehicle of the type in which a transverse passageway is provided through the body, permitting the operator to readily alight or dismount from the vehicle, in which the control elements are disposed in the passageway so as to simplify the starting and stopping of the vehicle under all conditions while the operator is standing or sitting therein.

In my Patent #1,777,966 granted October 7, 1930, I have disclosed a delivery vehicle including a passageway extending transversely through the body, which passageway is provided with a low floor line enabling the operator of the vehicle to readily mount the vehicle in making the deliveries for which purpose the vehicle was particularly designed. In the operation of vehicles of this character it is desirable that a control arrangement be provided that will enable the operator of the vehicle to expeditiously start, stop and govern the vehicle with a minimum of effort all to the end that the vehicle is capable of most efficiently serving the purpose for which it was provided. It is further desirable that in such a vehicle the operator be provided with a seat so that when the vehicle is driven over relatively long distances in reaching a section in which deliveries are to be made, the operator may operate the vehicle with comfort in a seated position, which seat is foldable so as not to interfere with the movements of the operator in the passageway.

The present invention aims to provide a control arrangement for a delivery vehicle of the type just referred to, that will enable an operator of the vehicle to efficiently and expeditiously control the vehicle either in standing or seated position, and to correlate the control elements that protrude into the passageway with the seat provided for the operator in such a way as to provide a maximum clearance in the passageway when the seat is not in use.

The invention also aims to provide an efficient arrangement whereby the clutch, forming a part of the driving mechanism of the vehicle, and the braking mechanism may be simultaneously operated in proper sequency by a single foot pedal disposed in the passageway through the body of the vehicle, whereby a standing operator can control both clutch and brake with one foot.

Another object of the invention is to provide a delivery vehicle in which the clutch forming a part of the driving mechanism of the vehicle and the brake mechanism are interconnected for successive operation either by a single foot pedal conveniently arranged in the vehicle body, or by a hand lever located so that the vehicle may be efficiently stopped by the operator of the vehicle, irrespective of the position that he may occupy, within wide limits, in the vehicle body.

This invention also aims to provide a dual control for the clutch, forming a part of the driving mechanism of the vehicle, and the braking mechanism for the vehicle, in which the same elements that interconnect the clutch and the braking mechanism may be selectively operated either by a foot pedal or a hand lever associated with such elements in such way that the operation thereof by the foot lever does not affect the hand lever.

Another object of the invention is to provide a vehicle control including a foot pedal for the successive operation of the clutch and the brake, and a second foot pedal connected to the braking mechanism alone so as to provide foot control of the brakes in proper relation to the clutch and independently of the clutch.

Another object of the invention is to provide a folding seat in the form of a saddle, arranged so that the occupant thereof may conveniently operate the vehicle control elements disposed in a passageway extending transversely of the body of the vehicle, which seat is swingingly mounted so that it may be swung toward the side of the passageway at which said control elements are located, so that a free and unobstructed passageway is provided at one side of the passageway through the body.

A still further object of the invention is to provide a foldable seat for a delivery vehicle of the kind that will clear the passageway extending transversely of the body, which seat may be swung toward the side of the passageway at which the control elements of the vehicle are located, and which may be adjusted to occupy a substantially horizontal position or a substantially vertical position in which the operator of the vehicle may lean against the seat in operating the vehicle.

Another object of the invention is to provide a control mechanism for the clutch forming a part of the vehicle drive mechanism, and for the brake mechanism of the vehicle, in which the clutch and brake are operated successively from a single shaft between which and the clutch an arm and link are disposed that are, in driving position, at an oblique angle to each other, and in their non-driving position assume a substantially straight line relation to the end that the release of the clutch is rapid when the shaft is operated and so that after the clutch has been released, a further angular movement of the shaft will not affect it. Such further angular movement of the shaft is utilized to actuate the brake mechanism.

A still further object of the invention is to provide a vehicle control mechanism designed so that the clutch is operated in advance of the braking mechanism by providing a lost motion connection between the brake mechanism and the identical mechanism that operates the clutch, and to provide an alternative means of operating the clutch and brake in proper sequence, said means being connected to the shaft by mechanism including a lost motion connection that will permit the free normal operation of the clutch and brake in proper order.

Still further objects of the invention will appear as the description thereof proceeds with reference to the accompanying drawings in which:

Figure 1 is a perspective view of the preferred form of vehicle control mechanism.

Figure 2 is a fragmentary side elevational view of the parts appearing in Figure 1.

Figure 3 is a perspective view of the passageway through a delivery vehicle, showing the relation of the folding seat to the control elements disposed in said passageway.

Figure 4 is a perspective view similar to Figure 3 showing the seat folded in a different way.

Figure 5 is a perspective view similar to Figure 3, showing the seat in one of its operative positions.

Figure 6 is a view similar to Figure 5, showing the seat in the other of its operative positions.

Figure 7 is a rear elevational view of the seat support.

Figure 8 is a side elevational view of the seat support, showing the seat in assembled relation with respect thereto.

Like reference characters indicate like parts throughout the several figures.

The present invention is intended for application particularly to vehicles such as delivery vehicles, in which it is intended that the operator control the vehicle, at least at times, when he is in a standing or leaning position requiring that his weight be supported on one or the other of his feet, thus restricting the freedom of movement of the feet in controlling the vehicle. Vehicles of this character are frequently provided with a passageway extending transversely across the body thereof, in which the operator stands or in which he sits when he is driving the vehicle from one point to another. This passageway is provided in order to furnish free ingress and egress of the operator in making deliveries, the rapidity of which is dependent in large measure upon the ease and facility with which the operator can leave and enter the vehicle and operate the necessary controls through which the vehicle is frequently stopped and started.

Referring to the drawings, the floor within the body of such a passageway is designated by the numeral 10. Such floor extends across the body at the same level, except where it is interrupted by the tunnel 11, through which the drive shaft passes from a forwardly disposed power plant, arranged within the housing 12. Preferably the body is built so that the forward part thereof extends beyond the housing 12 and the power plant covered thereby, though any other desirable arrangement may be provided. Any suitable sliding or swinging closure 13 may close the opening in the body leading to the transverse passageway therein. An instrument panel 14 and a speedometer 15 may be disposed in the housing 12, where they may be conveniently seen by the operator of the vehicle.

Inasmuch as the vehicle is to be controlled at times by an operator who occupies the passageway in a standing position, a novel control mechanism illustrated in Figures 1 and 2 enabling this to be conveniently done, is included in the vehicle, such mechanism being disposed in large part so as to be housed in housing 12 as will be readily understood by those skilled in the art.

Referring to said figures, 16 designates an arm fixedly secured to a shaft 17 connected to clutch control mechanism of conventional form housed within a housing 18. The clutch forms a part of the driving mechanism for the vehicle in well known manner. 19 designates the master cylinder of a hydraulic braking system for the vehicle, the control elements of which are attached to a shaft 20 carrying a brake mechanism control arm 21 rigidly attached to the end thereof disposed externally of the master brake cylinder 19. In order that the brake mechanism control arm 21 and the clutch control arm 16 may be operated successively, a shaft 22 is rotatably journalled in suitable bearings 23 and 24 suitably supported on the frame of the vehicle or other stationary part thereof. Rigidly attached to the shaft 22 is an arm 25, the end of which remote from the shaft 22 carries a transversely extending pin 26, connecting said arm to one end of a link 27, the opposite end of which is connected to the free end of arm 16 at 28. Preferably, the link 27 includes a part in the form of a hollow member 29, in which another external threaded part 30 is fitted, permitting the length of the arm to be varied by adjusting the part 30 within the part 29, a locknut 31 holding the parts in adjusted position. It will be observed, referring to Figure 2, that the link 27 and the arm 25 are disposed at an oblique angle to each other when the clutch is in engaged position, the position in which the part is illustrated in said figure. In releasing the clutch the shaft 22 is operated in a counterclockwise direction, as hereinafter described, causing the arm 25 and links to approach a position in which they extend in a straight line. By virtue of this arrangement, the initial movement of the arm 25 causes first a rapid movement of the clutch arm 16. As the arm 25 and links 27 approach a position in which they extend in a straight line, the movement of the clutch control arm virtually ceases and further movement of the arm 25, bringing said arm and the link 27 into a straight line relation, or slightly beyond a straight line, has virtually no effect upon the clutch arm 16. The arrangement just described accordingly causes, when the shaft 22 is operated, first, a substantial movement of the arm 16, followed by virtually no further movement of said arm as the arm 25 and links 27 assume approximately a straight line position in relation to each other.

A further arm 32 is rigidly secured to the shaft 22 adjacent the bearing 24. The arm 32 adjacent its end remote from the shaft 22 is provided with a head 33 that is connected to the bifurcated portion 35 of a link 36, preferably made in two parts, whereby the effective length of the link may be varied by adjusting said parts with respect to each other, the adjustment being fixed by a locknut 37. The end of the link opposite to that which is connected to the arm 32 is bifurcated and each of the furcations is provided with an elongated slot 38. A pin 39 secured to the arm 21 passes through the slots in said furcations and provides a lost motion connection between said arm and said link. It will be observed that the pin 39 in its normal position, shown in Figure 2 of the drawings, occupies a position so that the shaft 22 may be rotated through a substantial angle without affecting the operation of the arm 21 and the brake mechanism actuated thereby.

The shaft 22 is operated by a foot pedal 40 rigidly connected to an arm 41, non-rotatably secured at 42 to the shaft 22.

An alternative arrangement for rocking the shaft 22 is provided, permitting the successive control of the clutch and braking mechanism by means of a hand lever 43, pivotally attached at 44 to the frame of the vehicle. The bifurcated head 45 of a link member 46 is pivotally connected to the lever 43 by means of a suitable pin 47'. Link member 46 is adjustably threaded so that link member 47 can be varied. The parts are held in adjustment by a locknut 48. The link member 47 is of bifurcated form and the furcations are slotted as shown at 49. An arm 50, non-rotatably secured to the shaft 22, is operatively connected at the ends remote from said shaft, to the link member 47 by means of a pin 51 extending transversely through the head 52, the pin being slidably disposed in the slots 49 of the link member 47. It will be observed that the slot 49 permits a substantial free movement of the arm 50 carried by the shaft 22 in counterclockwise direction, whereby the expected rotation of said shaft by means of the foot pedal is permitted without interference, by virtue of the fact that the arm 50 carried by the shaft is connected to the hand lever 43. Nevertheless, when the hand lever 43 is swung about its pivot 44, said lever is effected to rotate the shaft 22 in a counterclockwise direction, thus providing an alternative way of rotating said shaft and operating the clutch and braking mechanism connected thereto, though the alternative arrangement does not interfere with the functioning of the control of the vehicle by the foot pedal 40.

In order that the lever 43 may be held in adjusted position at which the clutch is released and the brakes applied, a rack 53 in the form of a sector is disposed adjacent thereto. Cooperating with said rack is a dog 54 having teeth or a tooth arranged to mesh with the teeth of the rack 53. The dog 54 is pivoted to the lever 43 by means of a suitable pin or bolt 55 and its movement is controlled from the upper end of the lever 43 by means of a bent arm 56 pivoted to the upper end of the lever at 57. Pivotally connected to the arm 56 at 58 is a link 59 that is pivotally attached to the dog 54 at 60. The link 59 is guided through a perforated ear 61 projecting laterally from the lever 43. A coil spring 62 surrounding said link and abutting at one end against the projecting ear 61 and at its other end against a pin 63, passing through link 59, serves to maintain the tooth or teeth of the dog 54 in engagement with the rack 53.

It will be observed that the foot lever 40 and the hand lever 43 are conveniently located for operation by an operator of the vehicle standing on the floor 10. Suitable fuel feed mechanism designated generally by the numeral 64 is likewise arranged on the floor of said passageway and the vehicle is provided in said passageway with a gear shift lever 65 of conventional form and an emergency brake control lever 66 likewise of any approved form. It will be observed further that the foot pedal 40 is arranged so that the operator can conveniently apply pressure thereto while in a standing position. When he desires to stop the vehicle or retard its movement, he applies pressure to the foot pedal 40, rocking the shaft 22 in the manner stated. The rocking of said shaft causes movement of the arms 26, 32 and 50. The arm 26 moves towards a position in which it occupies a straight line with the link 27, causing a rapid release of the clutch during the initial movement of the shaft 22. During such movement, the arm 32 moves with respect to the link 36, but inasmuch as the pin 39 is engaged in a slot in said link, such initial movement of said shaft does not affect the braking mechanism. However, when the arm 26 and the link 27 approach an approximately straight line position, the pin 39 reaches the end of the slot and the braking mechanism is then actuated in succession after release of the clutch. Arm 50 during such movement, simply moves in the slot 49 without interference, by virtue of the connection of said arm to the hand lever 43. When the operator of the vehicle is in a position where the foot pedal 40 is convenient, he will control the movement of the vehicle by means of said foot pedal. However, if the operator is in a position to more conveniently control the movement of the vehicle by means of the hand lever 43, he actuates said hand lever by drawing it toward him. Such movement causes the link 59 to actuate the shaft 22 to be operated in a counterclockwise direction, releasing the clutch and applying the brake mechanism in succession in the manner above described in connection with the operation of the same mechanism when operated by the foot pedal 40. The hand lever 43 is very convenient in anticipating a stop of the delivery vehicle, that is, when the operator intends to alight from the vehicle, he can shift his position so that he can comfortably do so and can then stop the vehicle by drawing the hand lever 43 toward him, as he is moving out of the passageway through the body. The ability of the operator of the vehicle to stop it quickly is accordingly greatly increased by virtue of the alternative arrangement provided for controlling the clutch and braking mechanism in succession through a single hand lever or a single foot pedal.

In driving the vehicle on grades, it is frequently desirable to apply the brake mechanism without releasing the clutch. To do this, the present invention contemplates the provision, where necessary, of an additional brake control mechanism arranged so that the operator of the vehicle may actuate the brake mechanism alone to retard the movement of the vehicle without disengagement of the clutch. Such independent control of the braking mechanism may be effected in a number of different ways. Preferably, a lever 67 provided at one end with a foot pedal 68 that protrudes from the housing 12 above the fuel control mechanism 64, is utilized for this purpose. The lever 67 is pivoted to the frame of the vehicle at 69 in any approved manner, at one corner of the triangular head 70 thereof (Figure 2). The upper corner of said triangular head is connected to the brake mechanism control lever 21 by means of a pin 71 that passes through the lever 21 and is connected thereto by a lost motion connection, permitting swinging of the pin in an arcuate path about the pivot 69. When the operator of the vehicle desires to retard its movement without releasing the clutch, he places his foot on the pedal 68, swinging the lever 67 about the pivot 69. Such swinging movement turns the operating arm 21 to apply the brakes to the vehicle. If desired, the lever 67 may be directly applied to the brake control shaft 20. A suitable coil spring 72 connected at one end to a suitable securing member 73, attached in any way to the frame of the vehicle, and connected at its opposite end to the lever 21 serves to maintain said lever in a position in which the brake mechanism is released. It will be understood that in shifting the gears by the lever 65, the operator merely depresses the pedal 41 sufficiently to release the clutch without applying the brake mechanism, the lost motion connection between the link 36 and the arm 21 permitting this to be freely done. In stopping or retarding the vehicle, the operator simply presses harder on the same pedal, providing a single pedal control for the clutch and brake mechanism which may be operated by an operator standing in the transverse passageway extending across the floor 10.

In order to further facilitate the operation of vehicles having a transverse passageway and in order to contribute to the comfort of the operator of the vehicle, a seat is preferably provided that is intended to be occupied by him in driving relatively long distances between two points at which deliveries are to be made, for example. Such a seat is made foldable, so that it may be conveniently disposed out of the way of the operator of the vehicle when he is frequently entering and leaving the same in performing his duties. In order that such seat may not interfere with the operator when he desires to enter or leave the vehicle body, this invention provides a seat arrangement that is disposed in the passageway, but secured thereto so that it folds toward the side of the passageway at which the various control elements of the vehicle are disposed. Since said control elements necessarily protrude more or less into the passageway, by attaching the seat at the same side of the passageway and making it fold toward said side, the other side of the passageway is maintained entirely free of obstructions or projections. Furthermore, in order that the controls may be most conveniently disposed with respect to the occupant of the folding seat, said seat is preferably pivotally mounted between the control elements so that the operator may conveniently leave the seat in either direction lengthwise of the transverse passageway. Said seat is, preferably, constructed in the form of a saddle which, in view of the fact that the seat is mounted between the control elements of the vehicles, enables the operator comfortably to occupy the seat and when occupying the seat to conveniently operate the controls.

To this end a bracket 74 is suitably attached between the foot pedal 41 and the foot pedal 68, or between the foot pedal 40 and the fuel control mechanism 64, in the corner of the passageway at the side thereof at which the foot pedal and the fuel control mechanism are disposed. Pivotally attached to bracket 74 on a cross bolt 75 is a seat support 76, consisting of a frame constructed in any desired manner. Preferably, the seat support 76 comprises metallic straps 77 and 78 which are relatively widely spaced apart adjacent the bracket 74, and which are bent toward each other so that they are in closely spaced relation adjacent the seat bracket 79, that is pivotally attached to the upper ends of said straps by means of a bolt 80. Suitable braces 81 and 82 rigidly connect the straps 77 and 78, forming a rigid support for the seat. The seat, in the form of a saddle 83, is rigidly attached to the saddle bracket 79. Projecting laterally from said bracket is a bent arm 84 to which a link 86 is pivotally attached at 85. Said link is intended to control the position of the saddle-like seat on the support 76. The link 86 is provided with a pair of longitudinally spaced apertures 87 and 88, either of which may receive a bolt or pin 89 to detachably connect the link 86 to the laterally bent end 90 of a seat-supporting strut 91, that is pivoted to depending ears 92 of the bracket 82 at 93. This strut 91 comprises a cylindrical portion 94 and a hollow sleeve-like portion 95 in which the portion 94 is intended to be adjusted to vary the length of said strut. A set-screw 96 or similar means may be utilized to retain the hollow member 95 in proper position with respect to the member 94. The end of the strut 91 that is intended to contact with the floor 10, is provided with a foot 97 of resilient material such as rubber, having a socket portion intended to receive the end of the strut and a rounded portion intended to contact with the floor, providing a cushioned support for the strut and the seat 83, the weight of which is supported mainly upon said strut when the seat is in its operative position.

The strut 91 is intended to fold between the straps 77 and 78 which comprise the seat-support 76 when the seat is in its folded position. In order that the strut may be automatically brought to its folded position when the seat is to be folded out of the passageway, a control link 98 is provided. The link 98 is pivotally connected at 99 between ears 100 projecting laterally from the bracket 74, and it is connected to the end of the curved arm 93 by the pin 89. It will be observed that the length of the link 98 exceeds the distance between the center of the connection 93 and the center of the pivotal connection 75 for the seat-support strap 76, the arrangement being such that when the seat-support is to be swung about the pivot 75, the strut 91 is projected upwardly as the seat is moved to its operative position, so that said strut is largely retracted between the straps 77 and 78 when the seat is in its folded position.

The seat 83 is capable of assuming two operative positions, that is, positions in which the seat is used while the operator is driving the vehicle. The first of these positions as illustrated in Figure 5 of the drawings, permits the seat to assume a substantially horizontal position. The second of these is illustrated in Figure 6, in which the seat illustrated assumes an approximately vertical position. The seat is arranged so that the operator can conveniently straddle the same and manipulate the foot pedal 40 with one leg and either the foot pedal 63 or the fuel control 64 with the other leg. With the position of the seat in Figure 6 of the drawings, the operator is intended to lean against the seat to provide a back rest while he is driving the vehicle, if he desires such a rest. If it is desired that the seat be used in the relation shown in Figure 5, the connection 89 is passed through the opening 87 in the link 86, thus maintaining the seat in the full line position illustrated in Figure 8. If it is desired to adapt it to assume its other operative position on the seat-support 76, the connection 89 is then made through the opening 88 in the link 86, so that the seat will maintain this relation with respect to the seat-support. When the seat is used in the position in which it is substantially horizontal, as shown in Figure 5, it may be readily swung to the same side of the passageway at which the control elements of the vehicle are disposed by swinging the seat-support toward the housing 12, causing the seat to assume the position shown in Figure 3 of the drawings. Then the strut 91 is drawn substantially out of the passageway extending transversely through the vehicle. When the seat is used in such way that it is disposed approximately in a vertical position, the latter is arranged as illustrated in Figure 6 of the drawings from which it may be collapsed and folded toward the housing in the manner illustrated in Figure 4, the strut 91 being withdrawn automatically by the folding of the seat as above pointed out. When the seat is folded in either of the positions illustrated in Figure 3 or Figure 4 of the drawings, it will be understood that the operator of the vehicle can control it while standing in position in the passageway. In so doing he controls the clutch by the foot pedal 40 and his left foot. If he desires to retard the movement of the vehicle without disengaging the clutch, he operates the foot pedal 68 by means of his right foot. When he desires to accelerate the vehicle, he operates the fuel control element 64 by his right foot. If the vehicle is moving at the time he wants to stop and he desires to shift his feet to prepare to promptly leave the passageway, he can stop the vehicle by withdrawing the clutch and operating the brake mechanism in succession by actuating the hand lever 49. This can be conveniently accomplished and the lever will hold its advanced position upon operation of the dog 54, which will engage the teeth of the segmental rack, maintaining the brake in applied position with the clutch released.

It will thus be seen that, by this invention, the control elements and a seat for the operation of a delivery vehicle of the type designed so as to permit the operator to drive it in standing position, are correlated so that the operator can conveniently leave the body through the transverse passageway. The control elements of the vehicle and the folding seat are disposed to one side of the passageway in such a position that the seat is conveniently arranged with respect to the control elements and so that all of said elements and the seat are disposed at one side of the passageway, maintaining the other side thereof free of obstructions to facilitate the work of the operator therein. It may be observed further that mechanism is provided for successively operating the clutch and the brake mechanism, either by a single foot pedal or by a single hand lever, and that additional means are provided to control the brake mechanism independently of the clutch.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a delivery vehicle of the kind that includes a passageway extending across the body, vehicle control elements in the form of a foot pedal controlling the clutch and brake mechanism of the vehicle, and a fuel feed control disposed at one side of said passageway, and a narrow seat disposed so as to be foldable toward the same side of said passageway, said seat being mounted between said pedal and said fuel feed control.

2. In a delivery vehicle of the kind that includes a passageway extending across the body, vehicle control elements in the form of a pair of foot pedals, one of which controls the clutch and brake mechanism of the vehicle and the other of which controls only the brake mechanism disposed at one side of said passageway, and a seat disposed so as to be foldable toward the same side of said passageway, said seat being mounted between said foot pedals.

3. The combination defined in claim 1 in which said seat is shiftable from a substantially horizontal to a substantially vertical position when in its unfolded condition whereby the control elements are conveniently operable by a driver sitting on the seat in the horizontal position or when leaning against the seat in substantially vertical position.

4. The combination defined in claim 1 including a further foot pedal disposed at the same side of said seat as said fuel feed control to actuate said brake mechanism independently of said clutch mechanism.

5. A delivery vehicle of the type that includes a body having a low level passageway extending transversely therethrough and located substantially intermediate the ends thereof, including control elements disposed at the forward portion of said passageway, a seat in the form of a saddle disposed in said passageway, a swingably mounted support for said seat mounted at the forward portion of said passageway whereby said seat may be shifted toward the same side of said passageway, said seat being pivotally attached to said support so that it may be caused to assume a position substantially parallel to the length of said support and means to hold said seat in the latter position.

6. In a delivery vehicle of the kind that includes a low level passageway extending across the body from side to side, and located substantially intermediate the ends thereof, vehicle control elements projecting into said passageway at one side thereof, and a seat pivotally mounted at the same side of said passageway so that it may be moved from a position in said passageway to a position at the side of said passageway above said controls to leave a clear aisle from said controls to the opposite side of said passageway, said seat when in position in said passageway being arranged so that the occupant thereof has convenient access to said control elements.

7. In a delivery vehicle of the kind that includes a low level passageway extending across the body from side to side and located intermediate the ends thereof, vehicle control elements including foot pedals and a hand lever at one side of said passageway, and a seat pivotally mounted at the same side of said passageway closely adjacent said hand lever whereby it may be moved from a position in said passageway to a position at the side of said passageway above said foot pedals to leave a clear aisle from said controls to the opposite side of said passageway, said seat when in position in said passageway being arranged so that the occupant thereof has convenient access to said foot pedals and said hand lever.

WILLIAM B. FAGEOL.